(12) United States Patent
Lewallen et al.

(10) Patent No.: US 9,500,826 B2
(45) Date of Patent: Nov. 22, 2016

(54) OPTICAL CONNECTOR SYSTEMS FOR HIGH-BANDWIDTH OPTICAL COMMUNICATION

(71) Applicant: CORNING OPTICAL COMMUNICATIONS LLC, Hickory, NC (US)

(72) Inventors: Christopher Paul Lewallen, Hudson, NC (US); James Phillip Luther, Hickory, NC (US); Martin Schulte, Wildau (DE)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 93 days.

(21) Appl. No.: 14/255,141

(22) Filed: Apr. 17, 2014

(65) Prior Publication Data

US 2015/0301285 A1    Oct. 22, 2015

(51) Int. Cl.
  *G02B 6/42* (2006.01)
  *G02B 6/38* (2006.01)
(52) U.S. Cl.
  CPC .......... *G02B 6/4292* (2013.01); *G02B 6/3885* (2013.01)
(58) Field of Classification Search
  CPC .................................................. G02B 6/4292
  See application file for complete search history.

(56) References Cited

U.S. PATENT DOCUMENTS

2003/0053767 A1*  3/2003  Cheng ............... G02B 6/4206
                                                           385/89
2013/0142211 A1    6/2013  Doany et al. ............. 372/50.12

FOREIGN PATENT DOCUMENTS

JP    2013-190638 A    9/2013
WO    2015153321 A1    10/2015

OTHER PUBLICATIONS

Fortusini et al, "Optical Plug Having a Translating Cover and a Complimentary Receptacle," U.S. Appl. No. 15/061,122, filed Mar. 4, 2016.

* cited by examiner

*Primary Examiner* — Jerry Rahll

(57) ABSTRACT

Receptacles and optical connector systems are disclosed. In one embodiment, a receptacle includes a receptacle body defining a connector cavity, wherein the receptacle body comprises a rear wall having a first surface and a second surface. The rear wall includes a ferrule opening dimensioned to accept a ferrule body of an optical connector. A connector engagement portion includes a perimeter notch within the second surface of the rear wall and surrounding the ferrule opening. The perimeter notch defines a connector engagement surface that is dimensioned to contact a portion of the optical connector. The receptacle further includes an active component assembly including a substrate, wherein the substrate is coupled to the first surface of the rear wall, and an active component substrate having an array of active components, wherein the active component substrate is aligned with the ferrule opening of the rear wall.

23 Claims, 13 Drawing Sheets

OPTICAL CONNECTOR SYSTEMS FOR HIGH-BANDWIDTH OPTICAL COMMUNICATION

BACKGROUND

The present disclosure generally relates to high-bandwidth optical communication and, more particularly, to optical connector systems for use in high-bandwidth optical communication systems.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

As the bandwidth of optical transceiver devices increases by advanced techniques such as wavelength division multiplexing, large amounts of data must be electronically transferred from the active devices and associated electronics to electronic components of the computing device (e.g., a data switching device of a data center) for further processing (e.g., up to 100 Gbps per channel). Further, the size of optical transceiver devices (e.g., laser diodes, photodiodes) continues to decrease, which presents challenges in maintaining proper alignment between the transceiver device and the optical connector to which it is connected. Misalignment between optically coupled components risks optical loss of the optical signals passing between the optically coupled components.

SUMMARY

Embodiments are directed to optical connector systems for high-bandwidth optical communication that transfer large amounts of data at high speeds between a receptacle and a computing device. Further, embodiments provide mechanical features to enable precise alignment between an optical coupling surface of an optical connector and active components (e.g., photodiodes and laser diodes) associated with a mated receptacle.

In this regard, in one embodiment, a receptacle for receiving an optical connector includes a receptacle body defining a connector cavity, wherein the receptacle body includes a rear wall having a first surface and a second surface. The rear wall includes a ferrule opening dimensioned to accept a ferrule body of the optical connector and a connector engagement portion surrounding the ferrule opening. The connector engagement portion includes a perimeter notch within the second surface of the rear wall and surrounding the ferrule opening. The perimeter notch defines a connector engagement surface that is dimensioned to contact a portion of the optical connector. The receptacle further includes an active component assembly including a substrate and active component substrate. The substrate is coupled to the first surface of the rear wall, and the active component substrate is disposed on a surface of the substrate. The active component substrate is aligned with the ferrule opening of the rear wall.

In another embodiment, an optical connector system includes and optical connector and a receptacle. The optical connector includes a mechanical engagement surface, a ferrule body having an optical coupling surface, and an array of lens elements at the optical coupling surface. The ferrule body extends from the mechanical engagement surface. The receptacle includes a receptacle body including a rear wall having a first surface and a second surface. The rear wall includes a ferrule opening dimensioned to accept the ferrule body of the optical connector, and a connector engagement portion surrounding the ferrule opening. The connector engagement portion includes a perimeter notch within the second surface of the rear wall and surrounding the ferrule opening. The perimeter notch defines a connector engagement surface that is dimensioned to contact the mechanical engagement surface of the optical connector. The receptacle further includes an active component assembly. The active component assembly includes a substrate, wherein the substrate is coupled to the first surface of the rear wall, and an active component substrate including an array of active components. The active component substrate is disposed on a surface of the substrate and is aligned with the ferrule opening of the rear wall such that the array of lens elements of the optical connector are aligned with the array of active components when the optical connector is inserted into the receptacle.

In yet another embodiment, a receptacle includes a receptacle body defining a connector cavity. The receptacle body includes a first wall, a second wall, and a third wall, wherein the first wall is adjacent to the second wall, the first wall includes a first biasing member extending from an interior surface of the first wall, the second wall includes a second biasing member extending from an interior surface of the second wall, and the third wall includes a ferrule opening dimensioned to accept a ferrule body of the optical connector. The receptacle further includes an active component assembly. The active component assembly includes a substrate and an active component substrate including an array of active components. The substrate is coupled to an exterior surface of the third wall. The active component substrate is disposed on a surface of the substrate and is aligned with the ferrule opening of the third wall.

In yet another embodiment, an optical connector system includes an optical connector and a receptacle. The optical connector includes a connector body having an insertion end defining an opening, and a ferrule body extending from the opening of the connector body. The ferrule body includes an optical coupling surface, wherein an array of lens elements is located at the optical coupling surface. The optical connector further includes a ferrule cover member disposed within the connector body. The ferrule cover member includes a body, an engagement surface, and an opening within the engagement surface, wherein the ferrule cover member is operable to translate into and out of the connector body. The receptacle includes a receptacle body defining a connector cavity. The receptacle body includes a rear wall and an active component assembly. The rear wall has a ferrule opening dimensioned to accept a ferrule body of the optical connector. The active component assembly further includes a substrate, and an active component substrate including an array of active components. The substrate is coupled to an exterior surface of the rear wall. The active component substrate is disposed on a surface of the substrate and is aligned with the opening of the rear wall. When the optical connector is in an unmated state, the ferrule cover member is biased in a forward position such that the optical coupling surface is disposed within the ferrule cover member. When the optical connector is an a mated state, the ferrule cover member is in a retracted position within the connector body, the engagement surface of the ferrule cover member contacts an interior surface of the rear wall, and the ferrule body is disposed within the opening of the rear wall of the receptacle body.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments are directed to receptacles and optical connector systems for high-bandwidth optical communication applications. The receptacles and optical connector systems described herein may be deployed in data center and telecommunications applications, for example. The optical connector systems described herein comprise mechanical features that allow for precise alignment of active components (e.g., photodiodes and laser diodes) with optical fibers of an optical connector while minimizing the application of mechanical forces on the active components. Further, embodiments described herein may employ flexible cables to transfer large amounts of data from an active component subassembly associated with a receptacle of the optical connector system to a computing device (e.g., a data switching device). Various embodiments of receptacles and optical connector systems are described in detail below.

Figure 1:
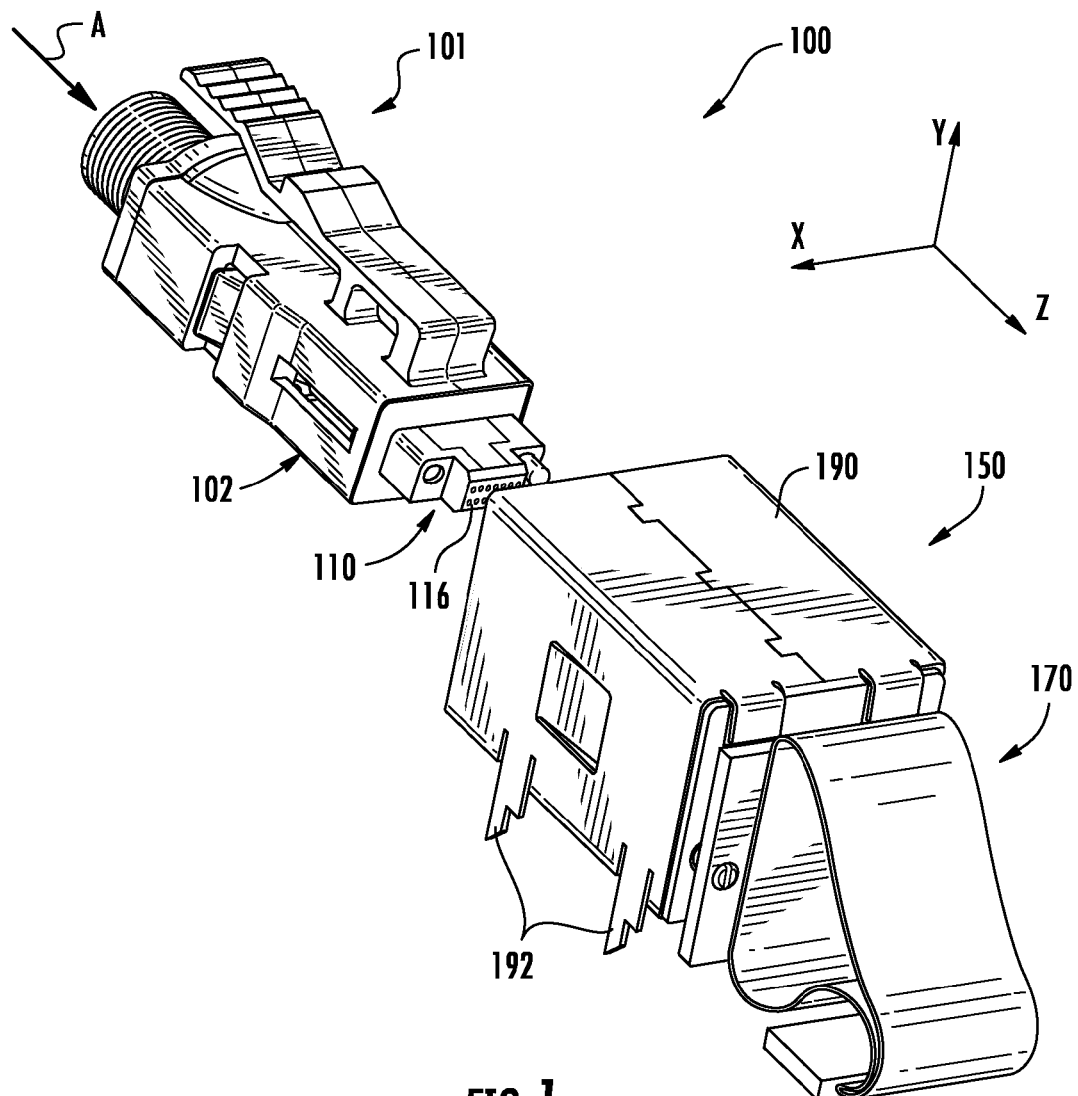
FIG. 1 is a perspective view of an optical connector system including an optical connector and a receptacle according to one or more embodiments described and illustrated herein.

Referring now to FIG. 1, an example optical connector system 100 is illustrated. Generally, the optical connector system 100 includes an optical connector 101, a receptacle 150, and an active component assembly 170 coupled to a rear surface 151 of the receptacle 150. The example receptacle 150 includes a receptacle housing 190 having tabs 192 to connect the receptacle 150 to a substrate, such as a circuit board. As an example and not a limitation, the receptacle 150 may be provided in a computing device (not shown), such as a data switching device in a data center (e.g., in a 1U shelf of a rack-based enclosure). In some embodiments, an array of receptacles 150 may be provided in a single computing device.

The optical connector 101 is configured to be inserted into the receptacle 150 to optically couple the optical connector 101 with the active component assembly 170 to provide optical communication therebetween. The optical connector 101 is provided at an end of an optical cable (not shown in FIG. 1, see FIG. 6) having a plurality of optical fibers disposed therein.

The active component assembly 170 is mounted on a rear surface 151 of the receptacle 150 such that it is orthogonal to an insertion direction A of the optical connector 101 along the z-axis. As described in more detail below in conjunction with FIGS. 3A-4B, the active component assembly 170 includes an array of active components 183 that transmit or receive optical signals. Electrical signals originating from the computing device are converted into optical signals by the active component assembly 170. These optical signals are then passed to an optical coupling surface 116 of the optical connector 101 where they are then passed to optical fibers (not shown) within the connector body 102 of the optical connector 101. Optical signals originating at a farend of an optical cable and provided to the optical connector 101 are passed to the active component assembly 170, which converts the optical signals into electrical signals that are then provided to various components of the computing device for further processing. In such a manner, the active component assembly 170 is an electro-optical and optoelectrical transducer.

Figure 2A:
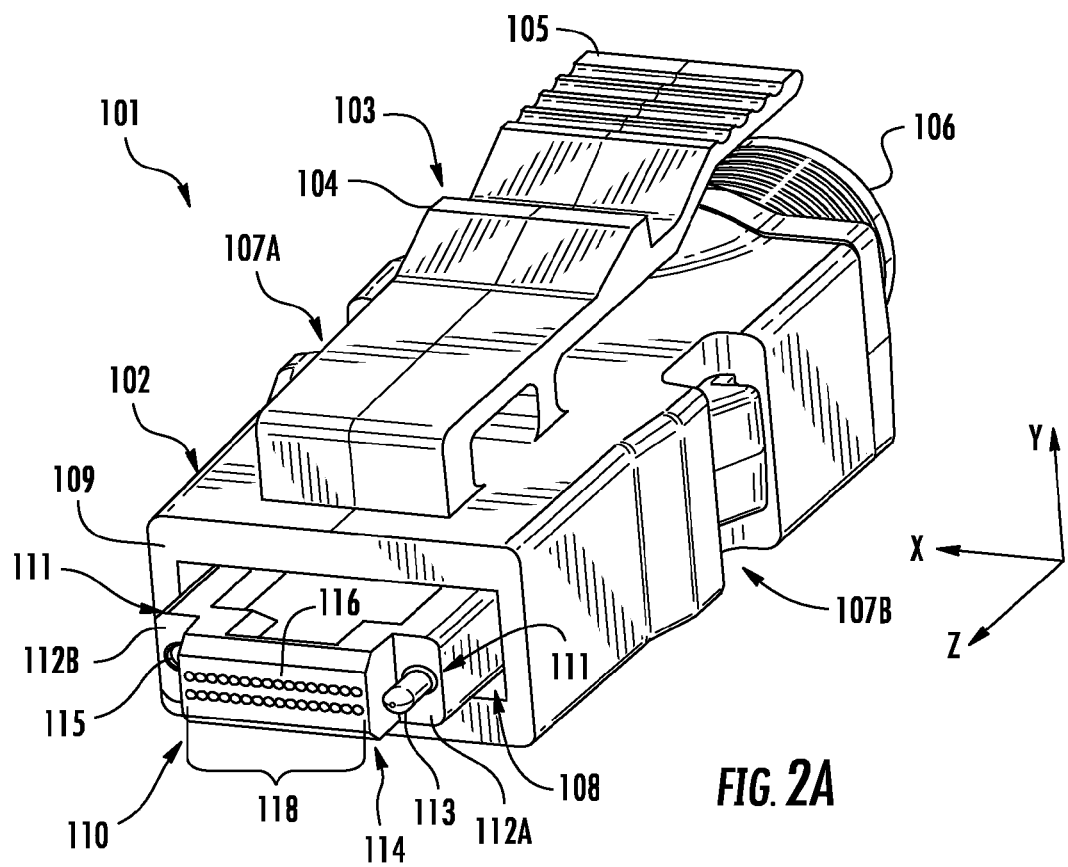
FIG. 2A is a front perspective view of the optical connector depicted in FIG. 1.
Figure 2B:
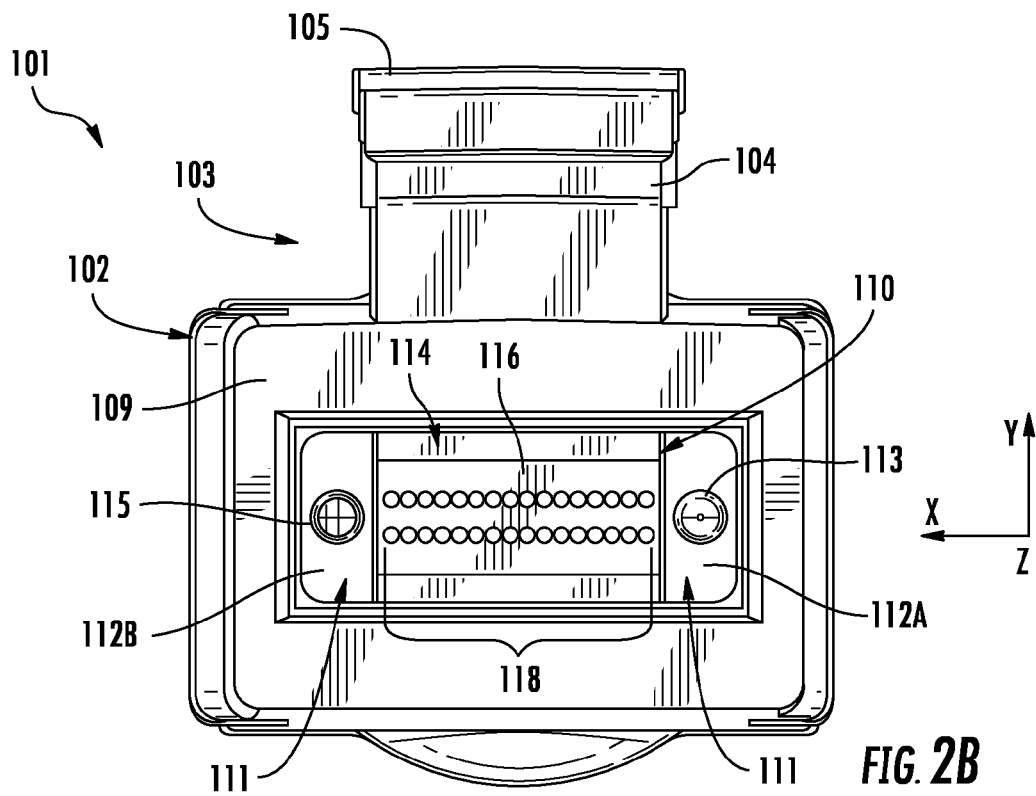
FIG. 2B is a front elevation view of the optical connector depicted in FIG. 1.
Figure 2C:
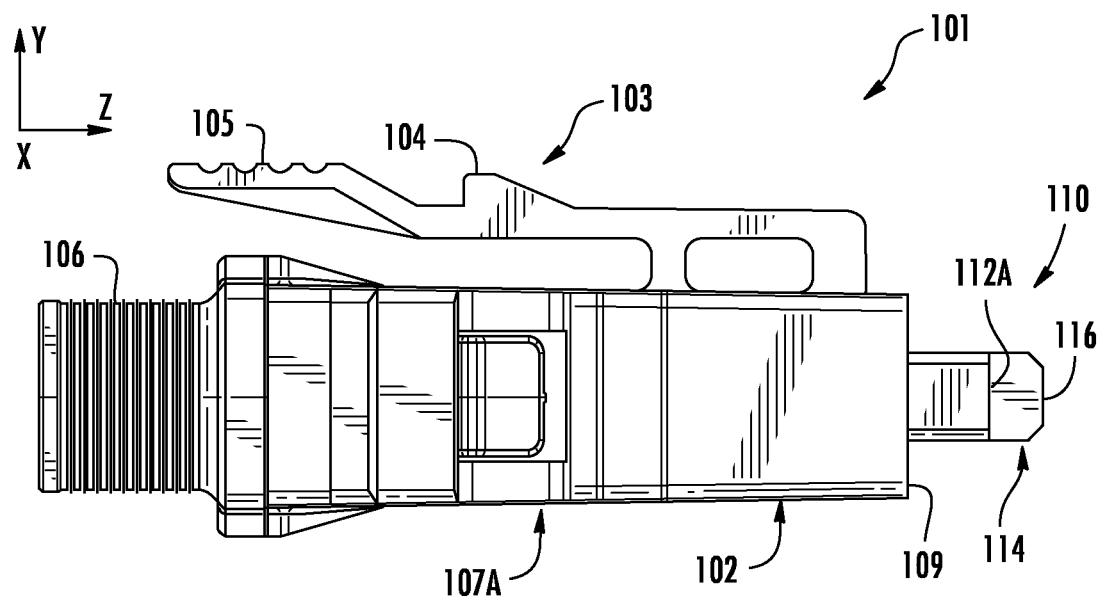
FIG. 2C is a side elevation view of the optical connector depicted in FIG. 1.

Referring now to FIGS. 2A-2C, the example optical connector 101 depicted in FIG. 1 will now be described in detail. Generally, the optical connector 101 includes a connector body 102 and a ferrule body 110. The ferrule body 110 extends from the connector body 102. In the illustrated embodiment, the connector body 102 defines an opening 108 at insertion face 109 from which the ferrule body 110 extends. However, in other embodiments, the ferrule body 110 may extend directly from the insertion face 109 of the connector body 102 and not from an opening 108 as shown in FIG. 2A.

In some embodiments, the connector body 102 may include one or more engagement features to maintain the optical connector 101 in a mated relationship with the receptacle 150. In the illustrated embodiment, the connector body 102 includes a locking tab 103 that is configured to engage a corresponding engagement feature provided in the receptacle 150 (e.g., see opening 156 illustrated in FIG. 3B). More specifically, the example locking tab 103 includes a release tab 105 and a detent portion 104 operable to engage the corresponding engagement feature provided in the receptacle 150. The detent portion 104 may assist in locking the optical connector 101 to the receptacle 150. The connector body 102 may be made of plastic or other compliant material such that pressing the release tab 105 toward the connector body 102 releases the detent portion 104 from the engagement feature of the receptacle 150, thereby allowing the optical connector 101 to be removed from the receptacle 150. It should be understood that embodiments are not limited to the locking tab 103 illustrated in the figures, as other means of engaging the optical connector 101 with the receptacle 150 are also possible.

The example connector body 102 also includes first and second alignment tabs 107A and 107B. The first and second alignment tabs 107A, 107B are configured to contact first and second biasing members 159A, 159B provided in a connector cavity 154 defined by the receptacle 150 (see FIG. 3B). As described in more detail below, the first and second alignment tabs 107A, 107B of the optical connector 101 and the first and second biasing members 159A, 159B of the receptacle 150 cooperate to align an optical interface of the optical coupling surface 116 of the optical connector 101 with the active component assembly 170. In other embodiments, no alignment tabs are provided in the connector body.

In some embodiments, the connector body 102 defines a cable attachment feature 106 for attaching the optical connector 101 to an optical cable (not shown). In the illustrated embodiment, the cable attachment feature 106 is configured as a threaded portion configured to mate with a corresponding threaded portion or may be a crimp surface. The optical cable includes a plurality of optical fibers that may be inserted into fiber bores 133 within the ferrule body 110 (see FIGS. 6A and 6B). Thus, the cable attachment feature 106 may be provided to easily connectorize an optical cable. It should be understood that the cable attachment feature 106 may be configured differently from that illustrated in FIG. 2A in some embodiments. In other embodiments, no cable attachment feature 106 is provided such that optical connector 101 is an integral component with respect to the optical cable.

The ferrule body 110, which maintains the optical fibers, extends from the connector body 102. The example ferrule body 110 includes a mechanical engagement surface 111 defined by a first region 112A and a second region 112B, and an optical coupling surface 116 that is offset from the mechanical engagement surface 111. The optical coupling surface 116 is provided on a protruding portion 114 of the ferrule body 110 that extends from the first and second regions 112A, 112B of the mechanical coupling surface.

As described in more detail below, the mechanical engagement surface 111 is configured to contact an interior surface of the receptacle body 152. In other embodiments, the mechanical engagement surface 111 may have only one region, or it may be configured as a perimeter region completely surrounding the offset optical coupling surface 116. In the illustrate embodiment, the first region 112A of the mechanical engagement surface 111 includes a first alignment feature 113 configured as a pin, while the second region 112B of the mechanical engagement surface 111 includes a second alignment feature 115 configured as a bore. The first and second alignment features 113, 115 are configured to mate with corresponding alignment features within the receptacle 150. In other embodiments, more than (or less than) two alignment features are provided, and in any combination of pins and/or bores. Additionally, other suitable alignment features are possible as desired.

The optical coupling surface 116 has an array of lens elements 118 that define an optical interface. The example array of lens elements 118 includes two rows of sixteen lens elements; however, it should be understood that any number of rows and any number of lens elements may be provided. Referring to FIGS. 2A-2C, as well as to FIG. 5B, the individual lens elements 118 may be configured as refractive lenses that are integral with the ferrule body 110. Other lens types may also be utilized for the array of lens elements 118, such as gradient-index lenses, for example.

The array of lens elements 118 condition the optical signals that propagate through the optical coupling surface 116 for receipt by the active component assembly 170 or optical fibers within the connector body 102. Referring to FIG. 6B, the optical fibers may be disposed within fiber bores 133 such that optical signals pass through a bulk of the ferrule body 110. Accordingly, the material chosen for the ferrule body 110 should be transmissive to the wavelengths of the optical signals passing through the optical coupling surface 116. As non-limiting examples, the ferrule body 110 may be fabricated from ULTEM™ sold by SABIC Innovative Plastics Holding BV of Riyadh, Saudi Arabia, or Zeonex® cyclic olefin polymer sold by Zeon Chemicals LP of Louisville, Ky., USA.

Figure 3A:
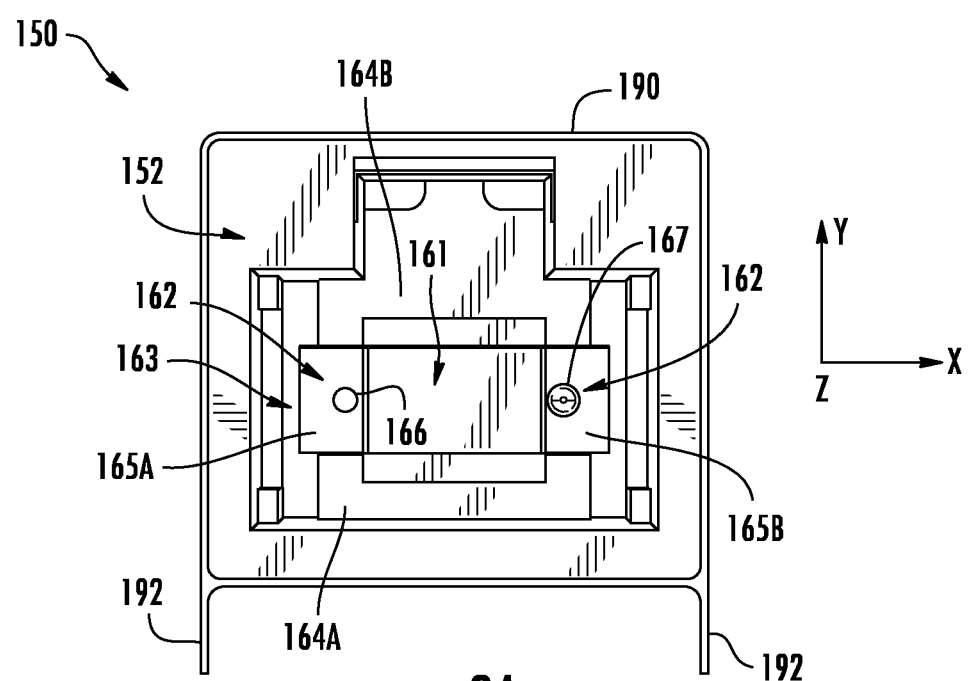
FIG. 3A is a front elevation view of the receptacle depicted in FIG. 1.
Figure 3B:
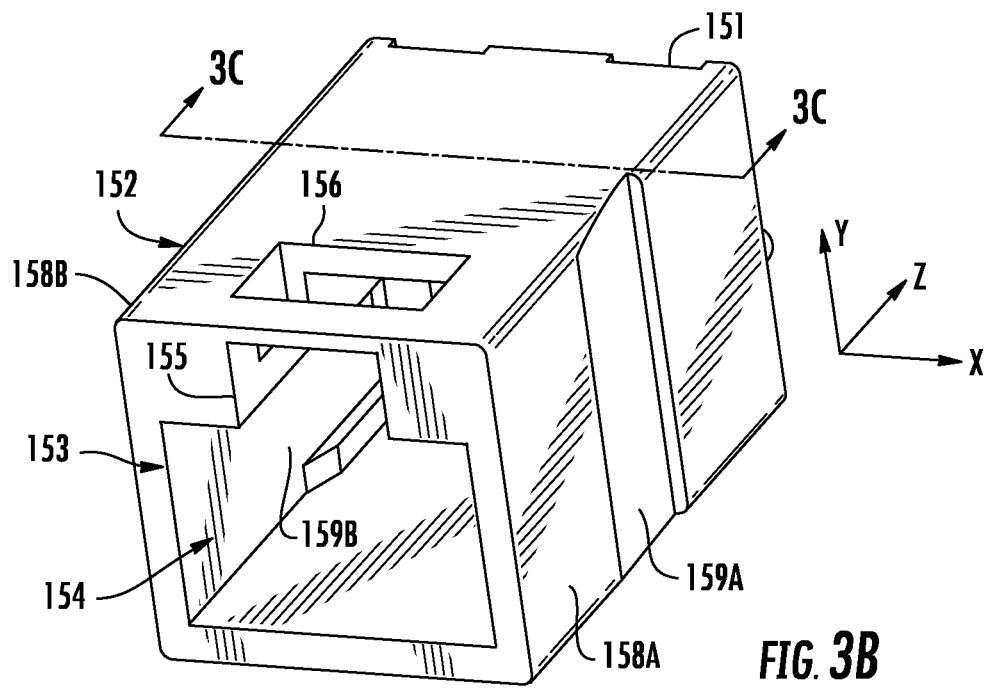
FIG. 3B is a front perspective view of a receptacle body of the receptacle depicted in FIG. 1 according to one or more embodiments described and illustrated herein.
Figure 3C:
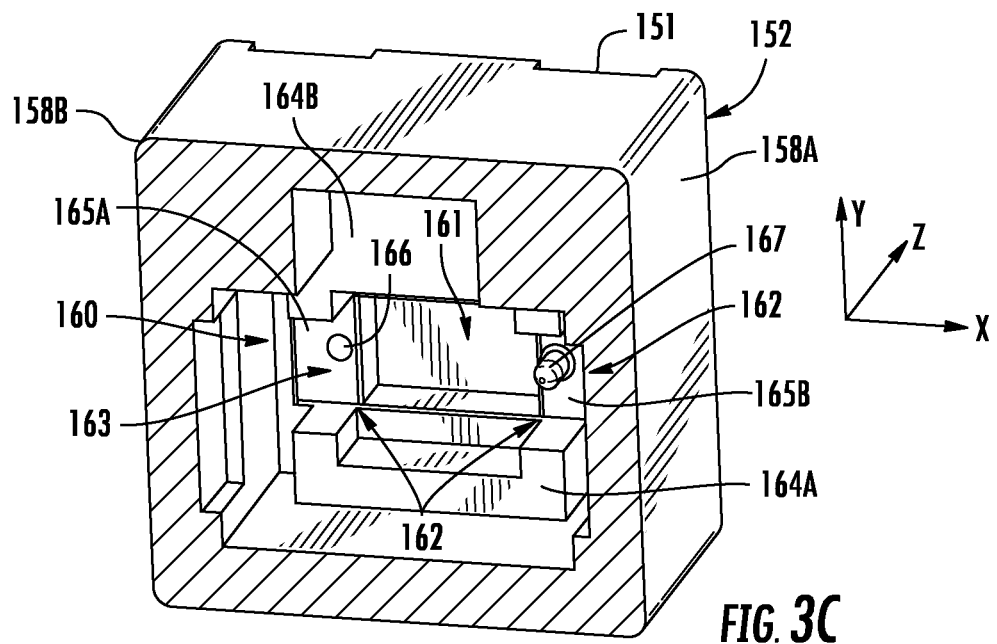
FIG. 3C is a cutaway view of the receptacle body depicted in FIG. 3B.

Referring now to FIGS. 3A-3C, the example receptacle 150 depicted in FIG. 1 is illustrated. FIG. 3A is a front elevation view of the receptacle 150, while FIG. 3B is a perspective view of a receptacle body 152 of the receptacle 150, and FIG. 3C is a cutaway view of the receptacle 150 depicted in FIG. 3B. FIGS. 3B and 3C depict the receptacle 150 without an outer receptacle housing 190 (i.e., depict only the receptacle body 152).

Referring initially to FIG. 3A, the receptacle 150 comprises a receptacle body 152 that is surrounded by a receptacle housing 190. The receptacle housing 190 may include tabs 192 for mounting the receptacle 150 to a substrate, such as a circuit board of a computing device. In some embodiments, the receptacle housing 190 is fabricated from a metal material such that the tabs 192 may be soldered to the substrate. In other embodiments, the tabs 192 may be removably insertable into female connectors on the substrate.

Referring generally to FIGS. 3A-3C, the receptacle body 152 comprises an opening 153 that defines a connector cavity 154 into which the optical connector 101 is inserted. The opening 153 and connector cavity 154 of the example receptacle body 152 includes a notched portion 155 dimensioned to accept the locking tab 103 of the connector body 102. The receptacle body 152 further includes an opening 156 to receive the detent portion 104 of the locking tab 103 to maintain the optical connector 101 and the receptacle 150 in a mated relationship.

The receptacle body 152 has a first wall 158A and a second wall 158B that define the connector cavity 154. A first biasing member 159A extends from an interior surface of the first wall 158A, and a second biasing member 159B extends from an interior surface of the second wall 158B. The first and second biasing members 159A, 159B contact a portion of the connector body 102 (e.g., the first and second alignment tabs 107A, 107B) to position the connector body 102 within the connector cavity 154 such that the optical coupling surface 116 is properly aligned with the active component assembly 170 along the x-axis as labeled in FIG. 3B.

The receptacle body 152 has a rear wall 160 that terminates the connector cavity 154. As described in detail below, the interior surface of the rear wall 160 provides a mechanical stop for the optical connector 101 disposed within the connector cavity 154. The rear wall 160 includes a ferrule opening 161 that is dimensioned to accept the protruding portion 114 of the ferrule body 110. Accordingly, the protruding portion 114 of the ferrule body 110 is positioned through the ferrule opening 161 when the optical connector 101 is fully inserted into the connector cavity 154 of the receptacle 150.

A connector engagement portion 163 surrounds the ferrule opening 161 and is configured to contact and support the optical connector 101 when it is fully inserted into the connector cavity 154. The connector engagement portion 163 is configured as a notch within an inner surface of the rear wall 160 that exposes a connector engagement surface 162 dimensioned to contact the mechanical engagement surface 111 of the ferrule body 110. In the illustrated embodiment, the connector engagement surface 162 of the receptacle body 152 is defined by a first region 165A and a second region 165B that are adjacent to first and second edges of the ferrule opening 161, respectively. In the illustrated embodiment, the first and second regions 165A, 165B of the connector engagement surface 162 are dimensioned to contact the first and second regions 112A, 112B of the mechanical engagement surface 111 of the ferrule body 110, respectively. Further, in the illustrated embodiment, a first alignment feature 166 is provided at the first region 165A of the connector engagement surface 162 (e.g., a bore), and a second alignment feature 167 is provided at the second region 165B of the connector engagement surface 162 (e.g., a pin). The first and second alignment features 166, 167 of the receptacle body 152 are configured to mate with the first and second alignment features 113, 115 of the optical connector 101, respectively, to align the optical coupling surface 116 with the active component assembly 170 when the optical connector 101 is fully inserted into the connector cavity 154 of the receptacle body 152.

In some embodiments, the connector engagement portion 163 further includes first and second ferrule support members 164A, 164B that contact upper and lower surfaces of the ferrule body 110 to support and maintain the ferrule body 110 within the receptacle body 152 and the ferrule opening 161 in a proper alignment position.

Figure 4A:
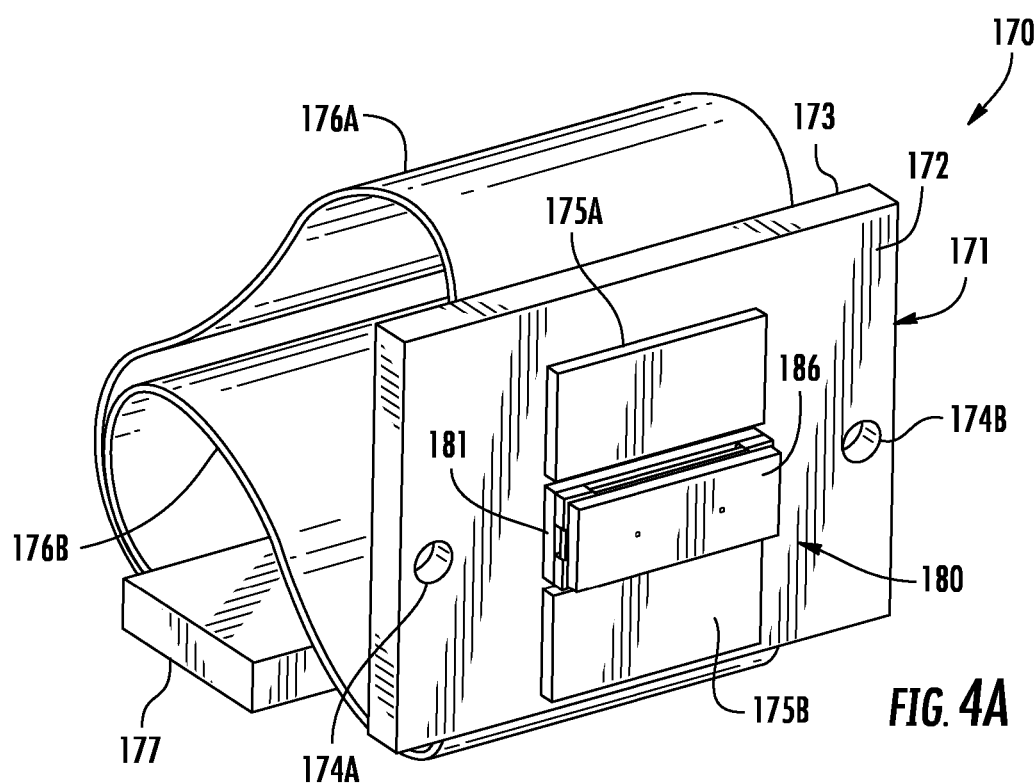
FIG. 4A is a front perspective view of an active component assembly of the receptacle depicted in FIG. 1 according to one or more embodiments described and illustrated herein.
Figure 4B:
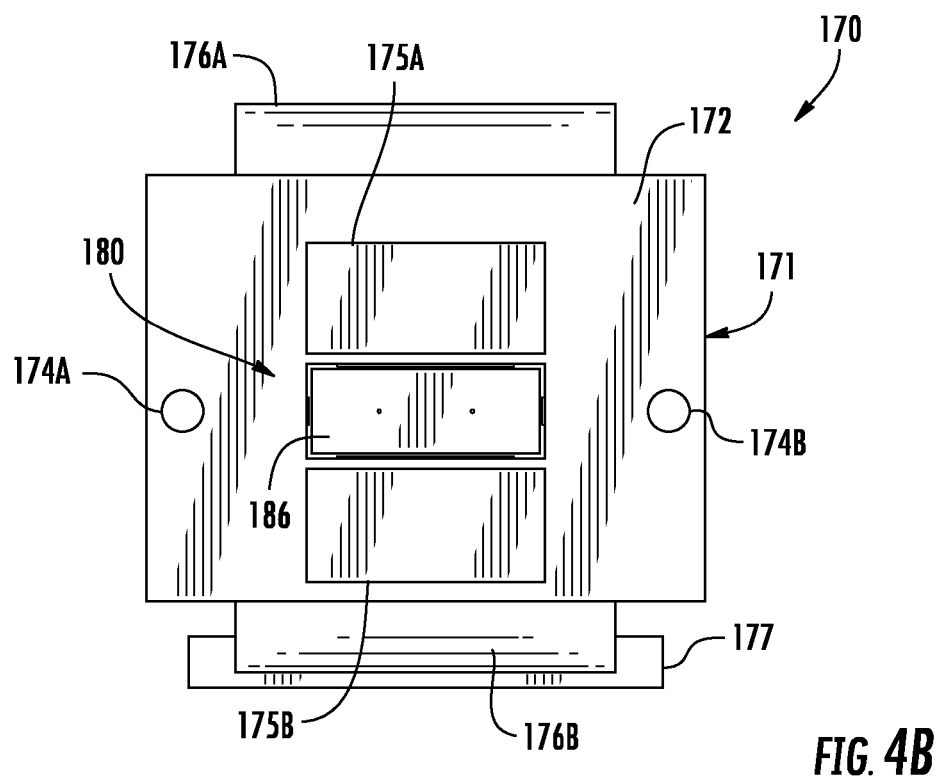
FIG. 4B is a front elevation view of the active component assembly depicted in FIG. 4A.
Figure 4C:
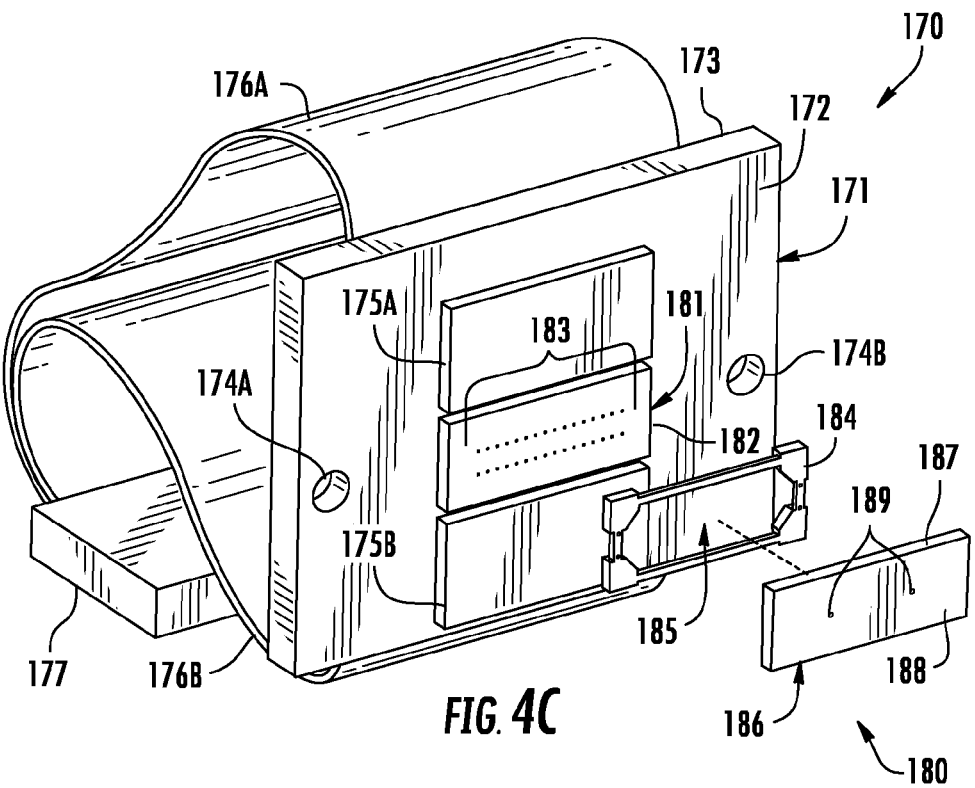
FIG. 4C is an exploded, front perspective view of the active component assembly depicted in FIG. 4A.

Referring now to FIGS. 4A-4C, the example active component assembly 170 of FIG. 1 is depicted. FIG. 4A is a front perspective view of the active component assembly 170, while FIG. 4B is a front elevation view of the active component assembly 170 and FIG. 4C is an exploded perspective view of the active component assembly 170.

The example active component assembly 170 includes a substrate 171 having a first surface 172 and a second surface 173, such as a circuit board (e.g., FR-4). Coupled to the substrate 171 is an active component substrate 181 that includes an array of active components 183, such as optical receivers (e.g., photodiodes), optical transmitters (e.g., laser diodes) or combinations thereof. The array of active components 183 is arranged within (or on) the active component substrate 181 such that it may be aligned with the array of lens elements 118 of the optical connector 101 when the optical connector 101 is inserted into the receptacle 150. The active component substrate 181 may be precisely positioned on the substrate 171 to allow for precise alignment between the array of active components 183 and the array of lens elements 118. In one embodiment, the active component substrate 181 is bonded to the first surface 172 of the substrate 171 by an adhesive.

In some embodiments the array of active components 183 is configured to communicate optical signals in accordance with wavelength division multiplexing ("WDM"), such as coarse wavelength division multiplexing ("CWDM") or dense wavelength division multiplexing ("DWDM") to provide for high-bandwidth optical communication.

In the illustrated embodiment, two driver circuit substrates 175A, 175B are also coupled to the first surface 172 of the substrate 171. The driver circuit substrates 175A, 175B may include circuits for controlling the active components 183, such as laser drivers, amplifiers, signal conditioning circuits, serializer/deserializer circuits, and the like. Alternatively, individual integrated circuits and other discrete electronic components may be disposed directly onto the first and/or second surfaces of the substrate 171 rather than on, or in addition to, individual substrates as shown in FIGS. 4A-4C.

The active component assembly 170 of the illustrated embodiment further includes a lens array substrate 186 that is coupled to the active component substrate 181. In the illustrated embodiment, the lens array substrate 186 is indirectly coupled to the active component substrate 181 by a spacer 184. The spacer 184, which defines an opening 185, is directly coupled to a perimeter of the active component substrate 181, and allows for the lens array substrate to be coupled to the active component substrate 181 such that it does not contact the array of active components 183. The active component substrate 181, the spacer 184, and the lens array substrate 186 (collectively, "the active component sub-assembly 180") may be bonded together by an adhesive, for example. In other embodiments, the lens array substrate 186 is coupled directly to the active component substrate 181 without the use of a spacer. For example, the lens array substrate 186 may include legs (not shown) that extend from a lens surface 187 of the lens array substrate 186 such that the lens surface 187 may be offset from the array of active components 183. In other embodiments, the lens array substrate 186 may be integral with the active component substrate 181.

Figure 5A:
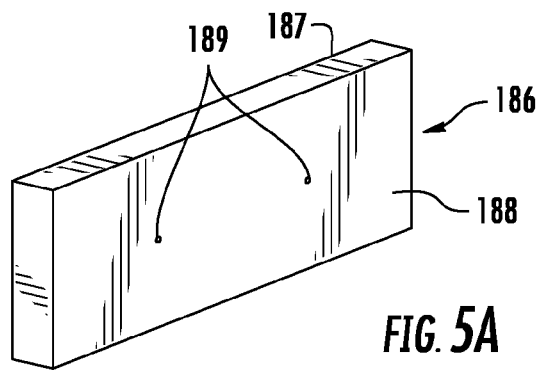
FIG. 5A is a front perspective view of a lens array substrate according to one or more embodiments described and illustrated herein.
Figure 5B:
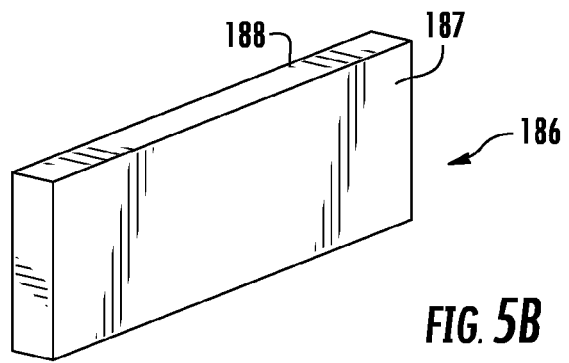
FIG. 5B is a rear perspective view of the lens array substrate depicted in FIG. 5A.

FIG. 5A provides a front perspective view of the example lens array substrate 186 depicted in FIGS. 4A-4C and FIG. 5B provides a rear perspective view. The lens array substrate 186 has a coupling surface 188 and a lens surface 187. The lens array substrate 186 may include alignment fiducials 189 to assist in precisely aligning and mounting the lens array substrate 186 with respect to the active component substrate 181. The lens surface 187 comprises the array of lens elements 179 that condition optical signals as they pass through the lens array substrate 186 for receipt by optical fibers within the optical connector 101 or the array of active components 183. The lens elements 179 may be configured as refractive lenses formed directly in the lens surface 187 of the lens array substrate 186. The material for the lens array substrate 186 should be chosen such that it is transmissive to the wavelengths of the optical signals, and substantially matches the coefficient of thermal expansion of the active component substrate 181 to maintain alignment between the array of active components 183 and the array of lens elements 179 over a desired operating temperature range.

The example active component assembly 170 further includes a first cable 176A and a second cable 176B that transfers data in the form of electrical signals from the substrate 171 to a connector 177 and a computing device substrate (e.g., circuit board) (not shown) within the computing device in which the receptacle 150 is installed. In the example embodiment, the first and second cables 176A, 176B extend from the second surface 173 of the substrate, although embodiments are not limited thereto. In some embodiments the first and second cables 176A, 176B may be configured as flexible cables. In some embodiments, the first and second cables 176A, 176B may be configured as multiple-layer flex cables. The first and second cables 176A, 176B provide for a large data transfer between the active component assembly 170 and the computing device to which the receptacle 150 is installed. It should be understood that more or fewer than two cables may be utilized. Further, in some embodiments, electrical connections between the substrate 171 and the circuit board of the computing device may be hard-wired rather than connected by use of cables and connectors.

It is noted that the example substrate 171 further includes mounting holes 174A, 174B to accept fasteners (e.g., screws) that may be used to mount the active component assembly 170 to the receptacle 150, in some embodiments.

Figure 6A:
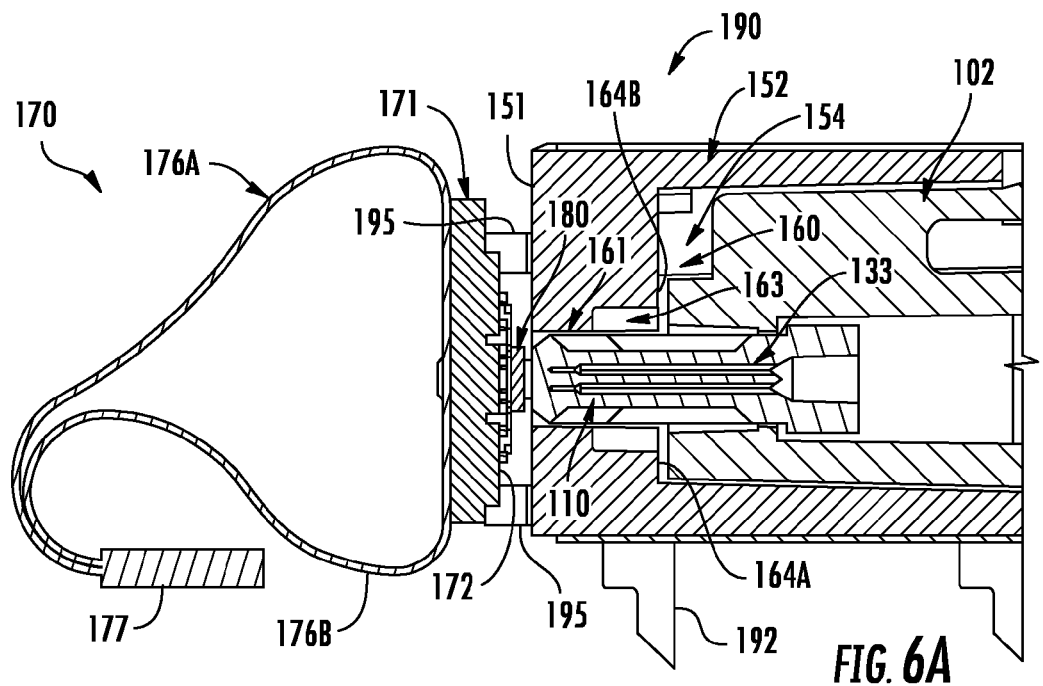
FIG. 6A is a cross-sectional view of the optical connector mated with the receptacle depicted in FIG. 1.
Figure 6B:
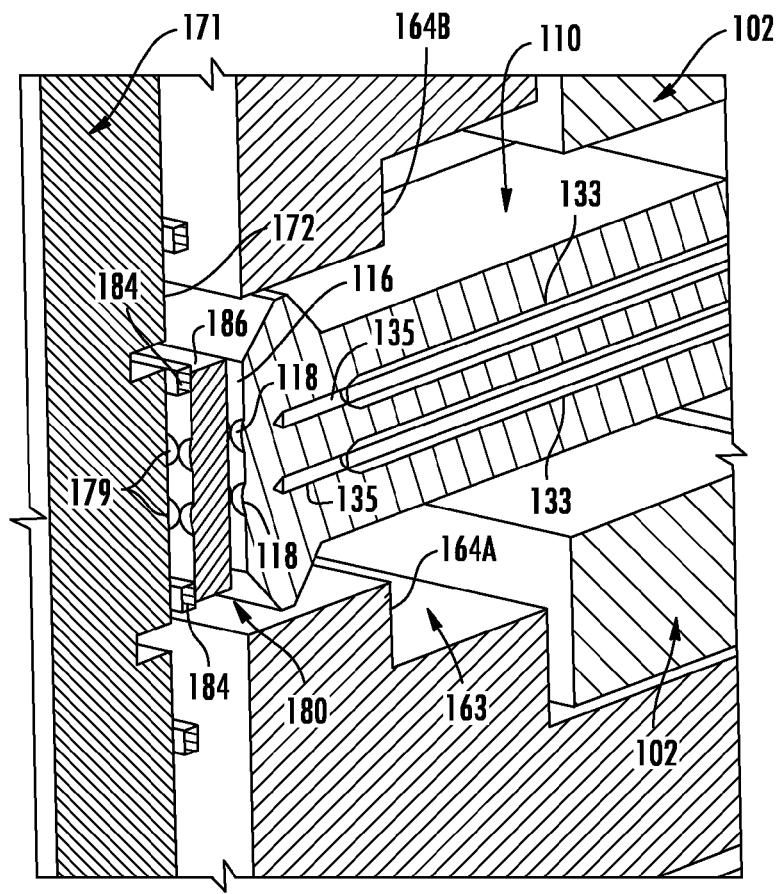
FIG. 6B is a close-up cutaway view of an optical coupling surface of the optical connector mated with the receptacle depicted in FIG. 6A.

Referring to FIG. 6A (as well as FIG. 1), the active component assembly 170 may be coupled to a rear surface 151 of the receptacle 150 by adhesive bonding and/or mechanical fasteners 195 as stated above. FIG. 6A is a cross-sectional view an optical connector 101 coupled to a receptacle 150. As shown in FIG. 6A, the active component assembly 170 is mounted to the receptacle 150 such that the active component sub-assembly 180 is aligned with the ferrule opening 161 in the rear wall 160 of the receptacle body 152.

FIG. 6B is a close-up, cutaway view of the mated optical connector 101 and receptacle 150 depicted in FIG. 6A. Referring to both FIGS. 6A and 6B, the optical connector 101 is disposed within the connector cavity 154 of the receptacle 150 such that the ferrule body 110 is located within the connector engagement portion 163 of the rear wall 160. The first and second regions 112A, 112B of the mechanical engagement surface 111 of the ferrule body contact the first and second regions 165A, 165B of the connector engagement surface 162 of the receptacle body 152, respectively. The first and second alignment features 113, 115 of the optical connector 101 mate with the first and second alignment features 166, 167 of the receptacle body 152, respectively. Additionally, the optical coupling surface 116 of the ferrule body 110 is aligned with the ferrule opening 161 in the rear wall 160, and therefore the array of lens elements 118 of the ferrule body 110 is substantially aligned with the array of lens elements 179 of the lens array substrate 186. It is noted that the optical coupling surface 116 of the ferrule body 110 does not contact the active component sub-assembly 180, thereby preventing mechanical forces from being applied to the active component sub-assembly 180.

Individual optical fibers (not shown) are disposed in fiber bores 133 within the ferrule body 110. The fiber bores 133 may have a tapered end 135 to accept a stripped end portion of the optical fiber (e.g., an end of the optical fiber having been stripped of outer layers). Accordingly, the receptacle 150 and optical connector 101 have mechanical features that optically align the optical fibers of the optical connector 101 with the array of active components 183 of the receptacle 150 to enable high bandwidth optical communication between computing devices that are optically coupled by an optical cable having the optical connectors described herein.

Figure 7:
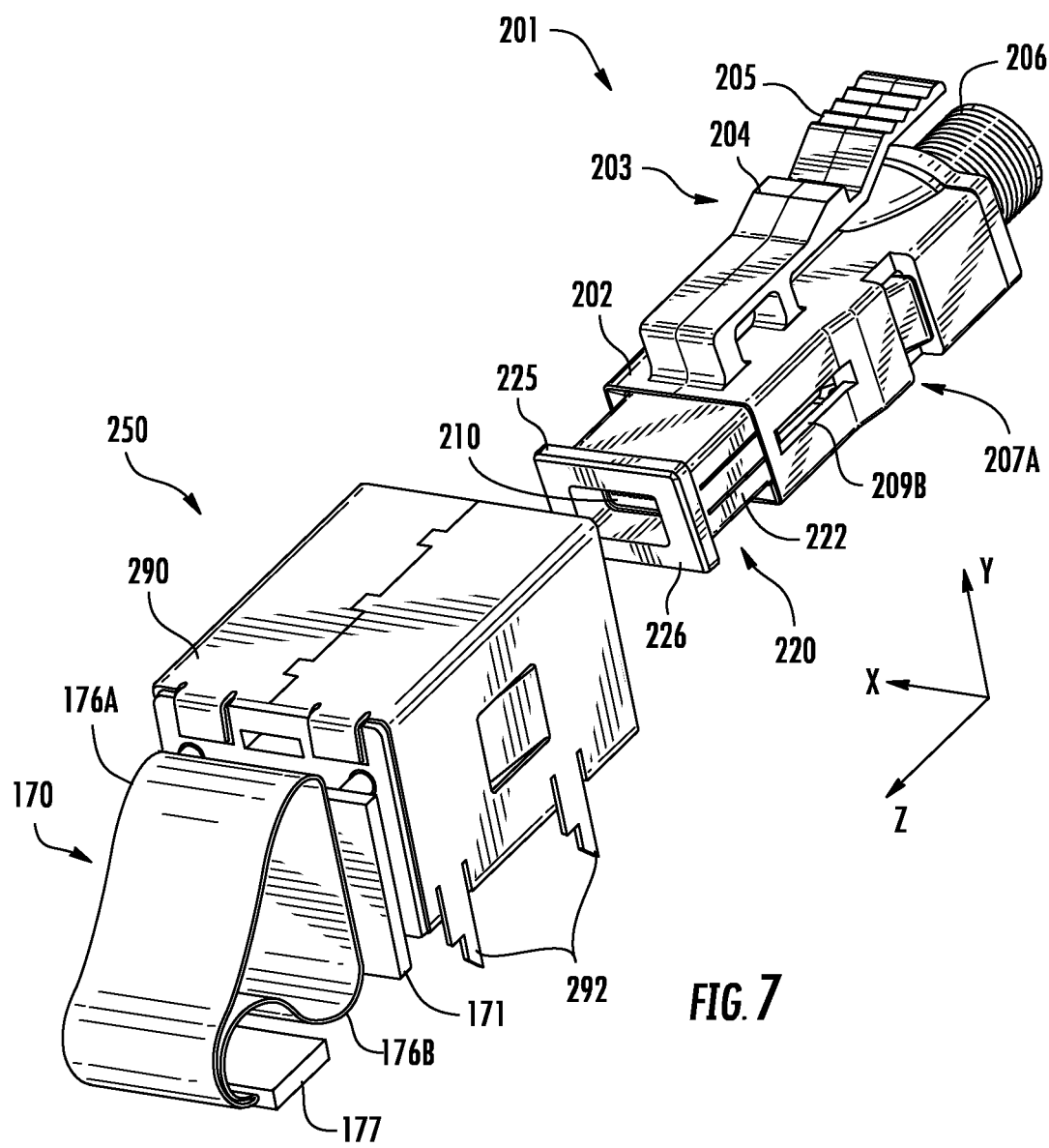
FIG. 7 is a perspective view of an optical connector system comprising an optical connector and a receptacle according to one or more embodiments described and illustrated herein.
Figure 8A:
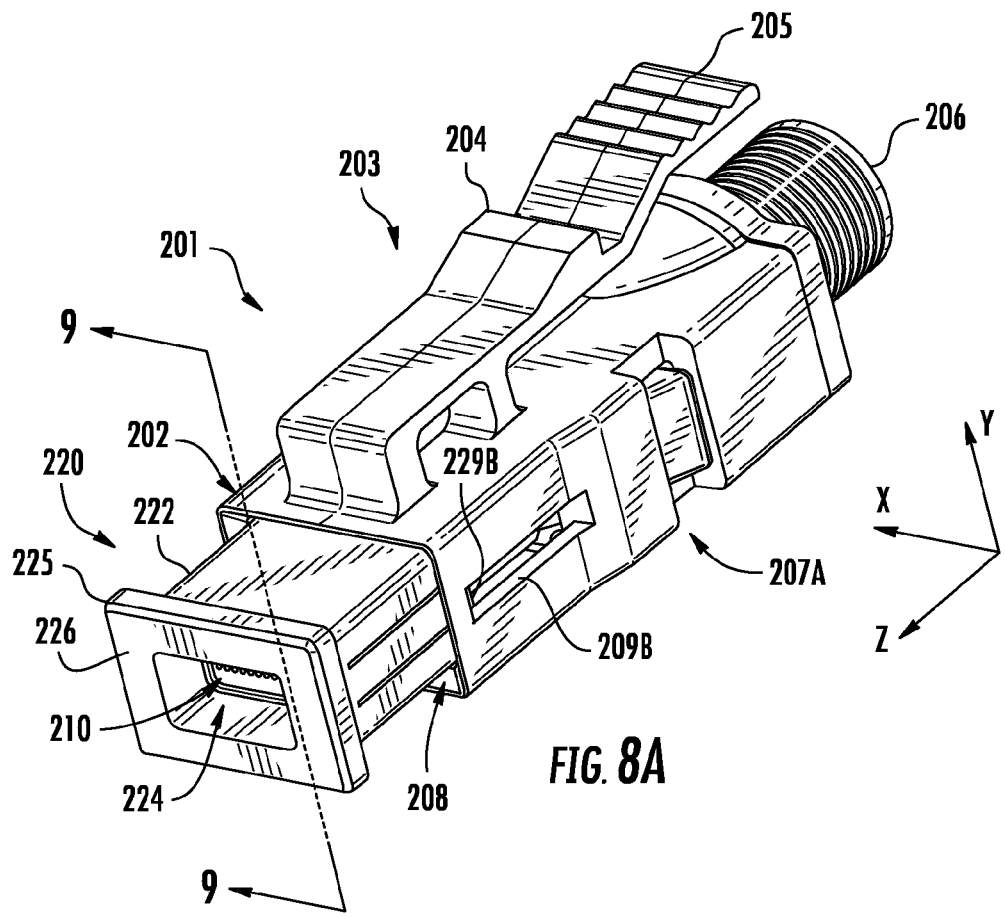
FIG. 8A is a front perspective view of the optical connector depicted in FIG. 7.
Figure 8B:
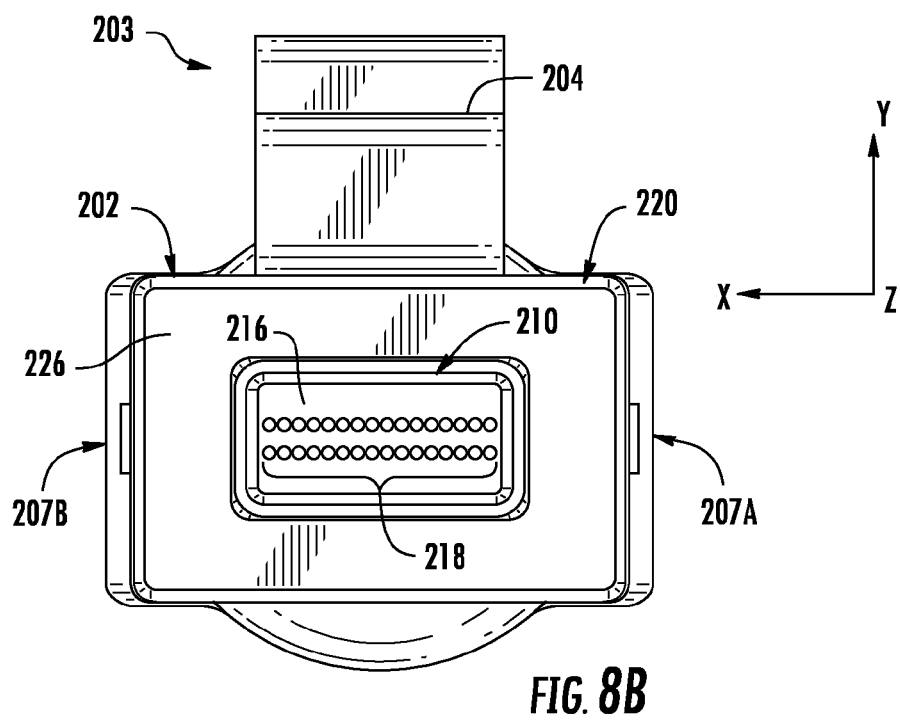
FIG. 8B is a front elevation view of the optical connector depicted in FIG. 7.
Figure 8C:
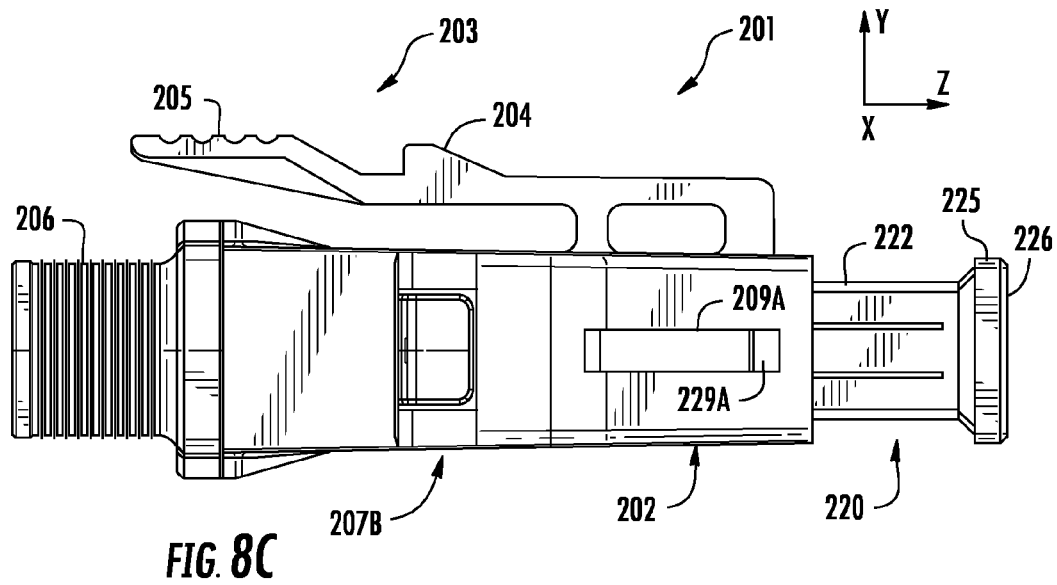
FIG. 8C is a side elevation view of the optical connector depicted in FIG. 7.

Referring now to FIG. 7, another embodiment of an optical connector 201 and a receptacle 250 is depicted that are similar to optical connector 101 and receptacle 150. As described in more detail below, the example optical connector 201 depicted in FIG. 7 includes a retractable ferrule cover member 220 that covers a ferrule body 210 when the optical connector 201 is in an unmated state. FIG. 8A is a front perspective view of the example optical connector 201 depicted in FIG. 7. FIG. 8B is a front elevation view of the optical connector 201 depicted in FIG. 7, while FIG. 8C is a side elevation view of the optical connector 201 depicted in FIG. 7.

Referring generally to FIGS. 7 and 8A-8C, the example optical connector 201 will now be described. Generally, the optical connector 201 includes a connector body 202 and a ferrule body 210. The ferrule body 210 extends from the connector body 202.

In some embodiments, the connector body 202 may include one or more engagement features to maintain the optical connector 201 in a mated relationship with the receptacle 250. In the illustrated embodiment, the connector body 202 includes a locking tab 203 that is configured to engage a corresponding engagement feature provided in the receptacle 250 (e.g., see opening 256 illustrated in FIG. 11B). More specifically, the example locking tab 203 includes a release tab 205 and a detent portion 204 operable to engage the corresponding engagement feature provided in the receptacle 250. The detent portion 204 may assist in locking the optical connector 201 to the receptacle 250. The connector body 202 may be made of plastic or other compliant material such that pressing the release tab 205 toward the connector body 202 releases the detent portion 204 from the engagement feature of the receptacle 250, thereby allowing the optical connector 201 to be removed from the receptacle 250. It should be understood that embodiments are not limited to the locking tab 203 illustrated in the figures, as other means of engaging the optical connector 201 with the receptacle 250 are also possible.

The example connector body 202 also includes first and second alignment tabs 207A, 207B. The first and second alignment tabs 207A, 207B are configured to contact interior surfaces of the receptacle body 250. In other embodiments, no alignment tabs are provided in the connector body 202.

In some embodiments, the connector body 202 defines a cable attachment feature 206 for attaching the optical connector 201 to an optical cable (not shown). In the illustrated embodiment, the cable attachment feature 206 is configured as a threaded portion configured to mate with a corresponding threaded portion or may be a crimp surface. The optical cable includes a plurality of optical fibers that may be inserted in to fiber bores 233 within the ferrule body 210. Thus, the cable attachment feature 206 may be provided to easily connectorize an optical cable. It should be understood that the cable attachment feature may be configured differently from that illustrated in FIGS. 8A and 8C in some embodiments. In other embodiments, no cable attachment feature 206 is provided such that optical connector 201 is an integral component with respect to the optical cable.

The ferrule body 210, which maintains a plurality of optical fibers, extends from the connector body 202 and is surrounded by a retractable ferrule cover member 220. The ferrule body 210 includes an optical coupling surface 216 having an array of lens elements 218 that define an optical interface.

The ferrule cover member 220 has a body 222 and a flange portion 225 located at the end of the body 222. The body 222 and flange portion 225 define an opening 223 and cavity 224 in which the ferrule body 210 is located. The flange portion 225 provides an engagement surface 226 that contacts a rear wall 260 of the receptacle body 252, as described in more detail below. In some embodiments, the ferrule cover member 220 does not include a flange portion 225 but rather the engagement surface 226 is provided at the end of the body 222.

Figure 10:
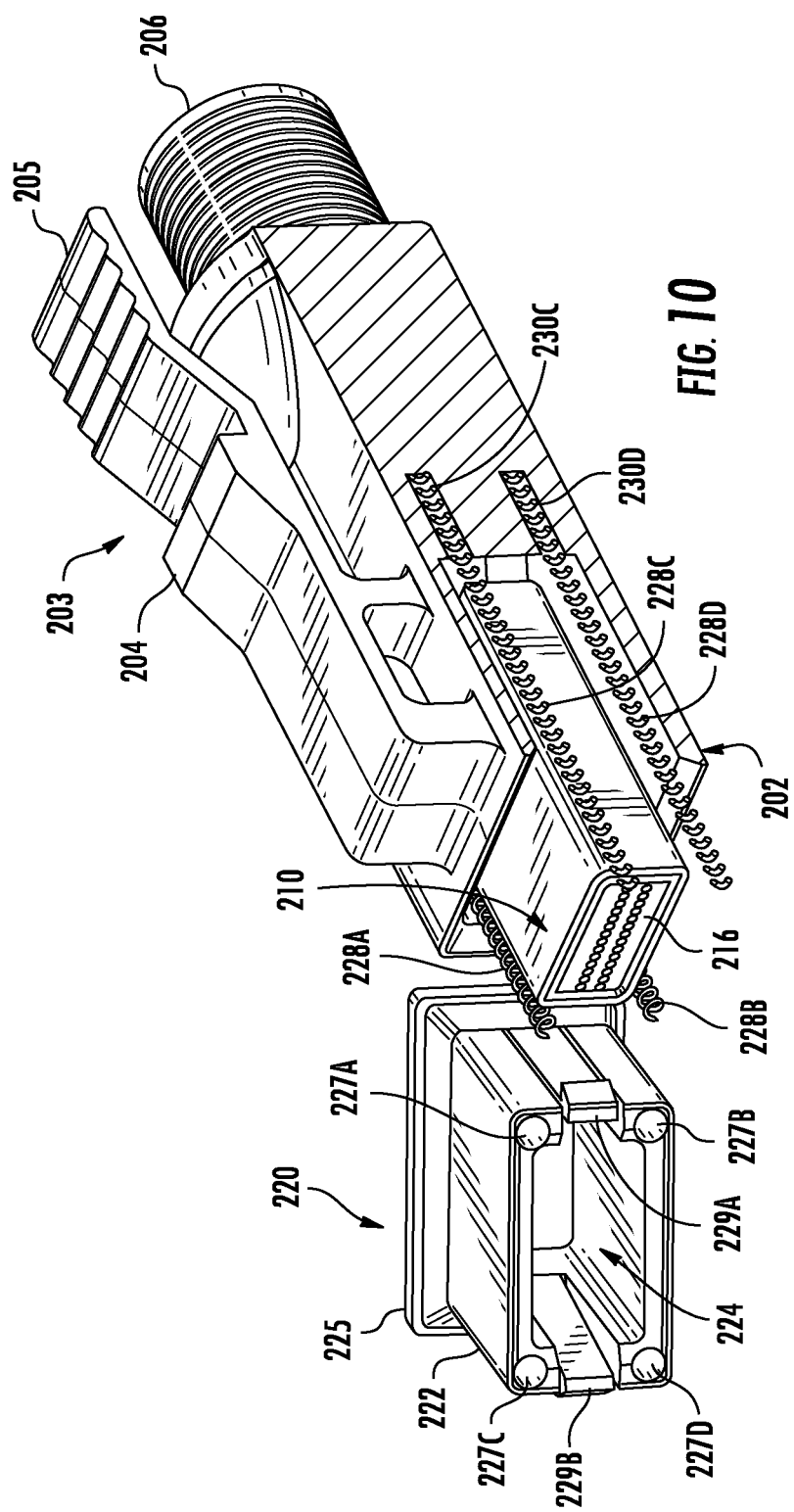
FIG. 10 is the cutaway, perspective view of the optical connector depicted in FIG. 9 with the ferrule body cover removed from the connector body of the optical connector.

The illustrated ferrule cover member 220 includes first and second track tabs 229A, 229B on opposing sides of the body 222 located at an end of the ferrule cover member 220 that is opposite from the flange portion 225 (see FIG. 10). The example connector body 202 has a first track opening 209A at a first side of the connector body 202 and a second track opening 209B at a second side of the connector body 202. The first and second track tabs 229A, 229B of the ferrule cover member 220 are disposed in the first and second track openings 209A, 209B, respectively. The first and second track openings 209A, 209B provide a linear track for the first and second tract tabs 229A, 229B such that the ferrule cover member 220 is limited to linear translation along the insertion axis z. When the ferrule cover member 220 is in a retracted state (e.g., when the optical connector 201 is mated with the receptacle 250), a portion the ferrule body 210 extends beyond the engagement surface 226 of the ferrule cover member 220.

Figure 9:
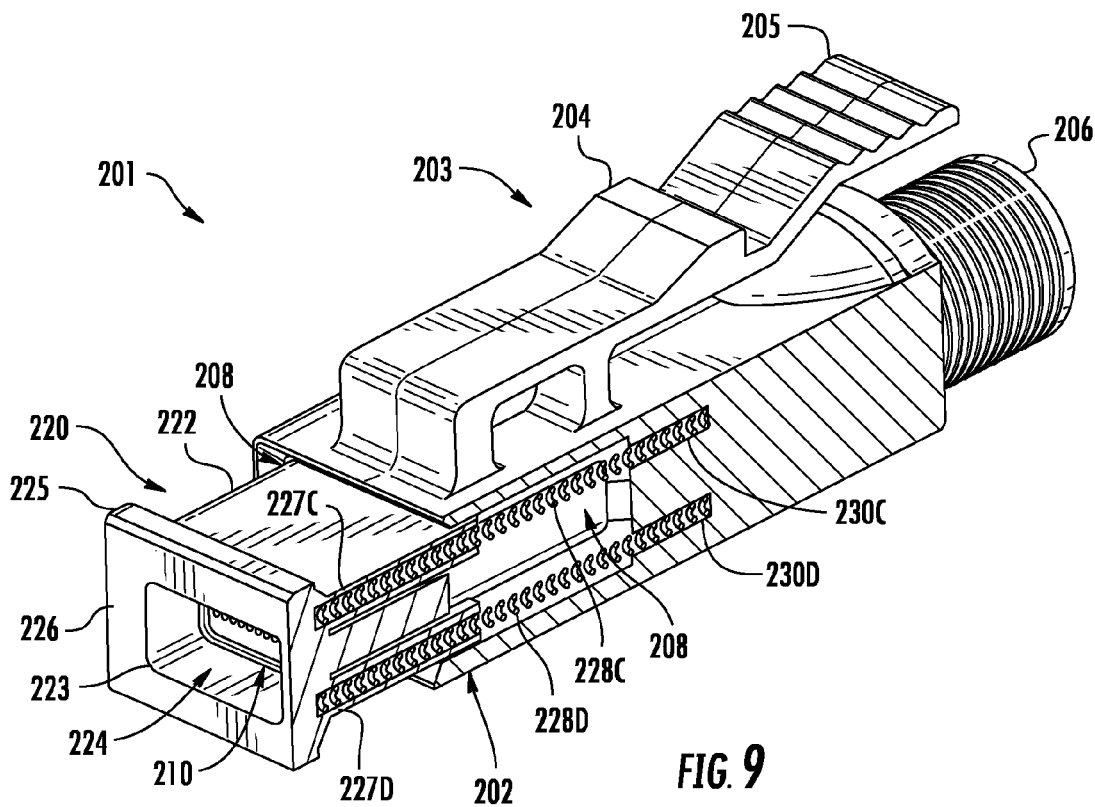
FIG. 9 is a cutaway, perspective view of the optical connector depicted in FIG. 7.

Internal components of the example optical connector 201 will now be described. FIG. 9 is a cutaway view of the optical connector 201 depicted in FIG. 8A. FIG. 10 shows the cutaway view of FIG. 9 with the ferrule cover member 220 removed from the connector body 202.

The body 222 of the ferrule cover member 220 includes a first plurality of bores 227A-227D, while the connector body 202 also includes a second plurality of bores 230A-230D. It is noted that bores 230A and 230B in the connector body 202 are not visible in FIGS. 10 and 11. They are positioned in the connector body 202 opposite from bores 230C and 230D, respectively. The first plurality of bores 227A-227D and the second plurality of bores 230A-230D are configured to accept a plurality of cover bias members 228A-228D that bias the ferrule cover member 220 away from the connector body 202 such that the optical coupling surface 216 of the ferrule body 210 is covered by the ferrule cover member 220. As described in more detail below, when the optical connector 201 is mated with the receptacle 250, the engagement surface 226 of the ferrule cover member 220 contacts a rear wall 260 of the receptacle 250 so that the cover bias members 228A-228D compress and the ferrule cover member 220 translates toward the connector body 202, thereby exposing the optical coupling surface 216 of the ferrule body 210.

Figure 11A:
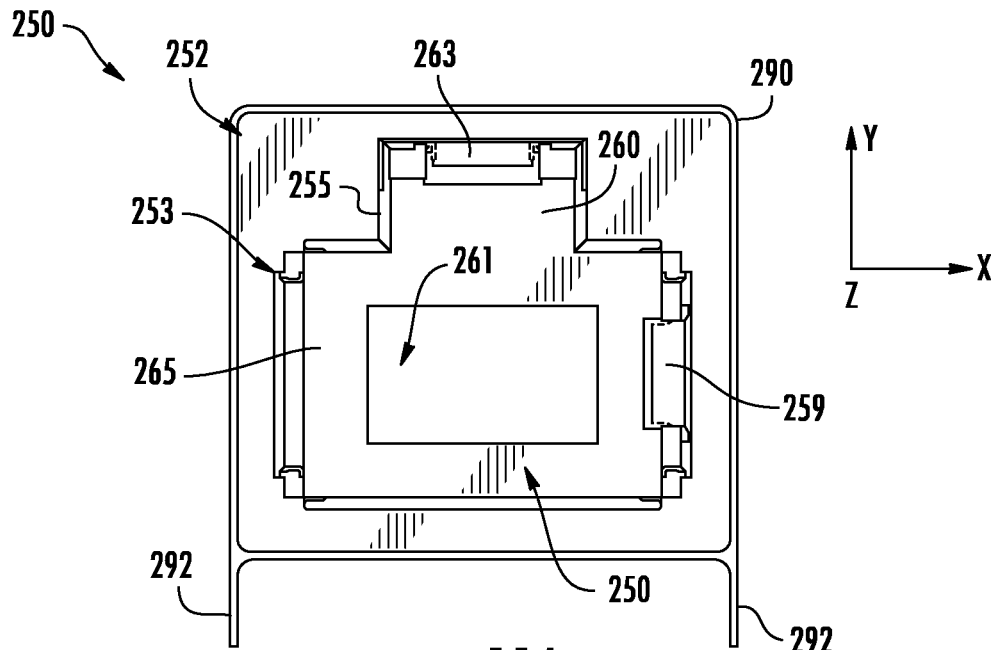
FIG. 11A is a front elevation view of the receptacle depicted in FIG. 7.
Figure 11B:
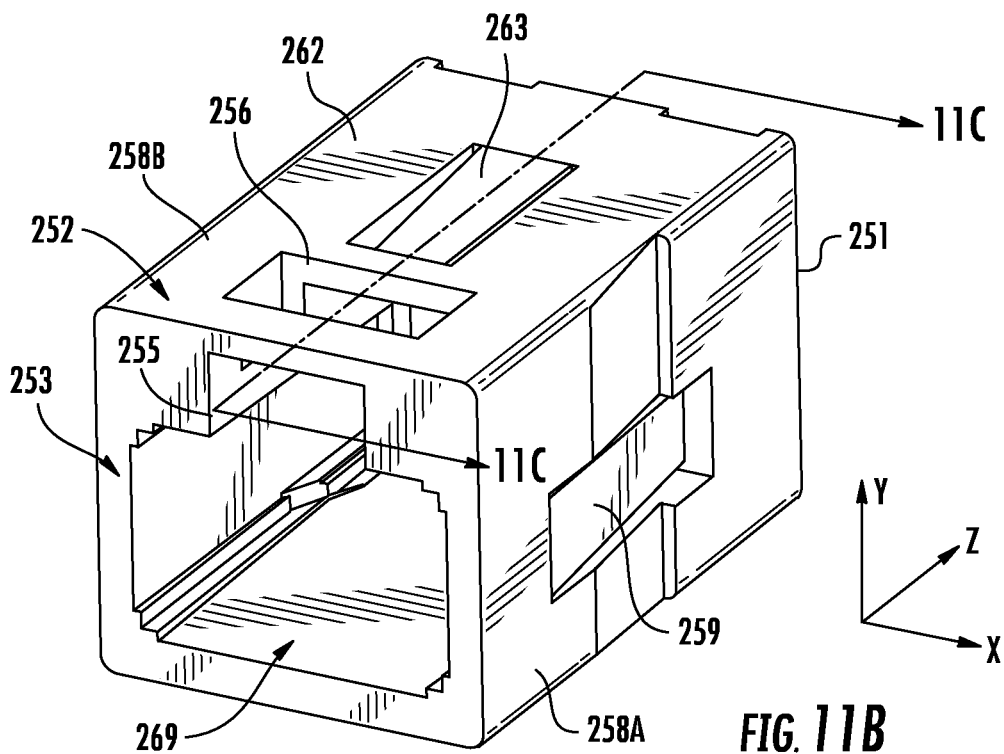
FIG. 11B is a is a front perspective view of a receptacle body of the receptacle depicted in FIG. 11A according to one or more embodiments described and illustrated herein.
Figure 11C:
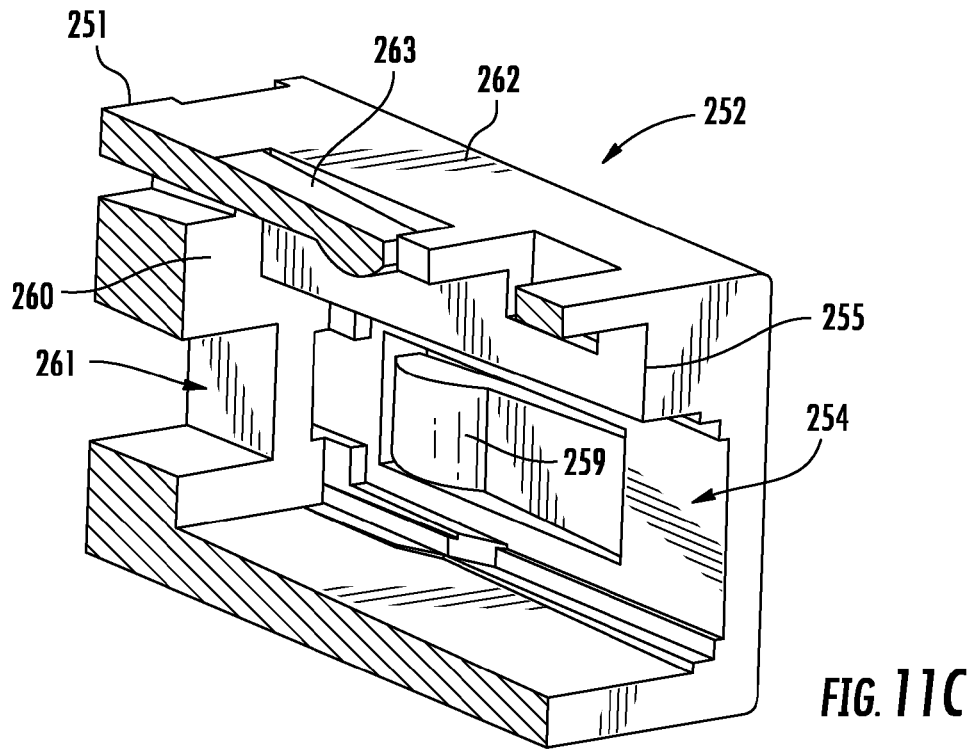
FIG. 11C is a cutaway, perspective view of the receptacle body depicted in FIG. 11B.

Referring now to FIGS. 11A-11C, the example receptacle 250 depicted in FIG. 7 will now be described. FIG. 11A is a front elevation view of the receptacle 250 depicted in FIG. 7. FIG. 11B is a front perspective view of an example receptacle body 252 of the receptacle 250 depicted in FIGS. 7 and 11A. FIG. 11C is a cutaway view of the receptacle body 252 depicted in FIG. 11B.

Referring initially to FIG. 11A, the receptacle 250 comprises a receptacle body 252 that is surrounded by a receptacle housing 290. The receptacle housing 290 may include tabs 292 for mounting the receptacle 250 to a substrate, such as a circuit board of a computing device. In some embodiments, the receptacle housing 290 is fabricated from a metal material such that the tabs 292 may be soldered to the substrate. In other embodiments, the tabs 292 may be removably insertable into female connectors on the substrate.

Referring generally to FIGS. 11A-11C, the receptacle body 252 comprises an opening 253 that defines a connector cavity 254 into which the optical connector 201 is inserted. The opening 253 and connector cavity 254 of the example receptacle body 252 includes a notched portion 255 dimensioned to accept the locking tab 203 of the connector body 202. The receptacle body 252 further includes an opening 256 to receive the detent portion 204 of the locking tab 203 to maintain the optical connector 201 and the receptacle 250 in a mated relationship.

The receptacle body 252 has a first wall 258A and a second wall 258B that define the connector cavity 254. Referring to FIGS. 11B and 11C, a first biasing member 259 extends from an interior surface of the first wall 258A. The first biasing member 259 contacts a portion of the connector body 202 (e.g., the first alignment tab 207A) to position the connector body 202 within the connector cavity 254 such that the optical coupling surface 216 of the ferrule body 210 is properly aligned with the active component assembly 170 with respect to the x-axis.

Additionally, the example receptacle body 252 includes a second biasing member 263 that extends from an interior surface of a third wall 262. The second biasing member 263 may contact a surface of the connector body 202 to properly position the connector body 202 within the connector cavity 254 with respect to the y-axis so that the optical coupling surface 216 of the ferrule body 210 is aligned with the active component assembly 170. It should be understood that more or fewer biasing members may be provided to properly align the optical coupling surface 216 of the ferrule body 210 with the active component assembly 170.

The receptacle body 252 has a rear wall 260 that terminates the connector cavity 254. The interior surface of the rear wall 260 provides a mechanical stop for the optical connector 201 disposed within the connector cavity 254. The rear wall 260 includes a ferrule opening 261 that is dimensioned to accept the ferrule body 210. Accordingly the ferrule body 210 is positioned through the ferrule opening 261 when the optical connector 201 is fully inserted into the connector cavity 254 of the receptacle 250.

Figure 12:
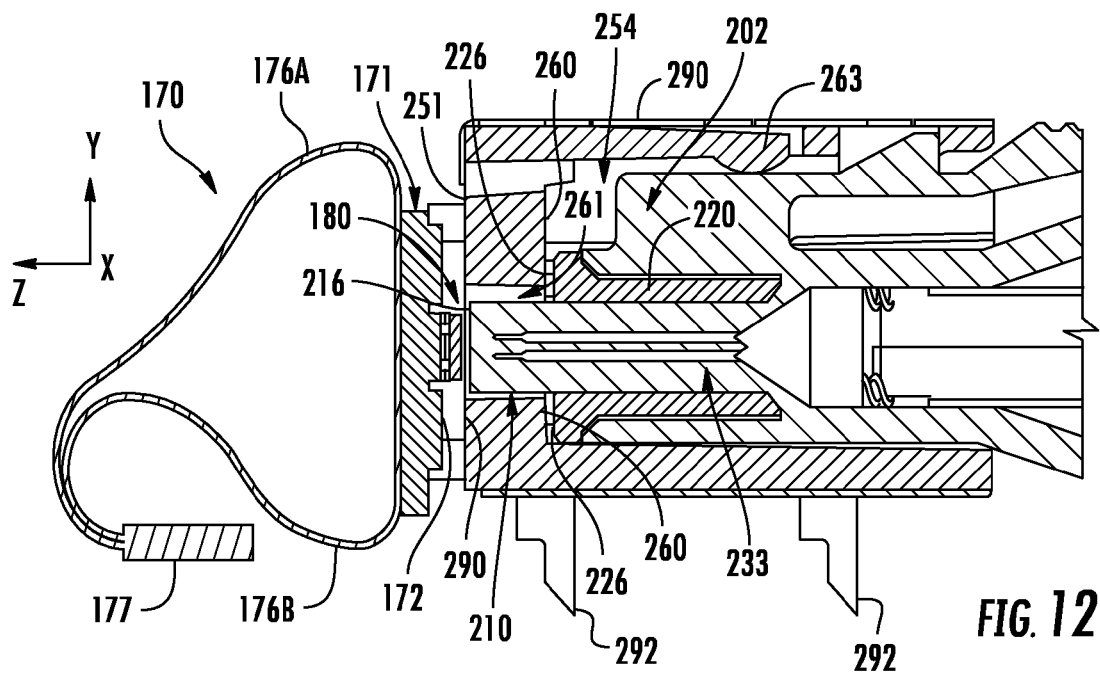
FIG. 12 is a cross-sectional view of the optical connector mated with the receptacle depicted in FIG. 7.

FIG. 12 depicts a cross-sectional view of an optical connector 201 mated with a receptacle 250 according to FIGS. 7-11C. An active component assembly 170 is mounted to a rear surface 251 of the receptacle body 252 such that the active component sub-assembly 180 is aligned with the ferrule opening 261 in the rear wall 260 of the receptacle body 252. The connector body 202 of the optical connector 201 is positioned within the connector cavity 254 of the receptacle body 252 such that the first and second biasing members 259 and 263 contact the connector body 202 to properly position the ferrule body 210 within the ferrule opening 261 in the rear wall 260 of the receptacle body 252.

As the optical connector 201 is inserted into the connector cavity 254 of the receptacle body 252, the engagement surface 226 of the ferrule cover member 220 contacts the interior surface of the rear wall 260. The insertion force applied to the optical connector 201 in the insertion direction (i.e., the positive z-axis direction) causes the ferrule cover member 220 to retract toward the connector body 202 in a direction opposite the insertion direction (i.e., the negative z-axis direction) such that the ferrule cover member 220 is in a retracted position.

The optical coupling surface 216 of the ferrule body 210 is disposed within the ferrule opening 261 in the rear wall 260, and therefore the array of lens elements 218 of the ferrule body 210 is substantially aligned with the array of lens elements 179 of the lens array substrate 186. It is noted that the optical coupling surface 216 of the ferrule body 210 does not contact the active component sub-assembly 180, thereby preventing mechanical forces from being applied to the active component sub-assembly 180.

Individual optical fibers (not shown) are disposed in fiber bores 233 within the ferrule body 210. Accordingly, the receptacle 250 and optical connector 201 have mechanical features to optically align the optical fibers of the optical connector 201 with the array of active components 183 to enable high-bandwidth optical communication between computing devices that are optically coupled by an optical cable having the optical connectors described herein.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A receptacle for receiving an optical connector, the receptacle comprising:
   a receptacle body defining a connector cavity, the receptacle body comprising a rear wall having a first surface and a second surface, wherein:
     the rear wall comprises a ferrule opening dimensioned to accept a ferrule body of the optical connector, and a connector engagement portion surrounding the ferrule opening;
     the connector engagement portion comprises a perimeter notch within the second surface of the rear wall and surrounding the ferrule opening, the perimeter notch defining a connector engagement surface that is dimensioned to contact a portion of the optical connector; and
     the connector engagement surface comprises a first alignment feature positioned proximate a first edge of the ferrule opening, and a second alignment feature proximate a second edge of the ferrule opening that is opposite from the first edge; and
   an active component assembly comprising:
     a substrate, wherein the substrate is coupled to the first surface of the rear wall; and
     an active component substrate comprising an array of active components, wherein the active component substrate is disposed on a surface of the substrate and is aligned with the ferrule opening of the rear wall.

2. The receptacle of claim 1, wherein the active component assembly further comprises a lens array substrate comprising an array of lens elements, wherein the array of lens elements is aligned with the array of active components of the active component substrate.

3. The receptacle of claim 2, wherein the active component assembly further comprises a spacer coupled to the active component substrate, and the lens array substrate is coupled to the spacer.

4. The receptacle of claim 1, wherein the active component assembly further comprises at least one flexible cable electrically coupled to the substrate.

5. The receptacle of claim 1, wherein the substrate is coupled to the first surface of the rear wall by one or more mechanical fasteners.

6. The receptacle of claim 1, wherein:
   the receptacle body comprises a first wall and a second wall;
   the first wall is adjacent to the second wall; and
   the receptacle body comprises a first biasing member extending from an interior surface of the first wall and a second biasing member extending from an interior surface of the second wall.

7. An optical connector system comprising:
   an optical connector comprising:
     a mechanical engagement surface comprising a first region adjacent to a first edge of the optical coupling surface and a second region adjacent to a second edge of the optical coupling surface;
     a ferrule body comprising an optical coupling surface, wherein the ferrule body extends from the mechanical engagement surface; and
     an array of lens elements at the optical coupling surface;
   a receptacle comprising:
     a receptacle body comprising a rear wall having a first surface and a second surface, wherein:
       the rear wall comprises a ferrule opening dimensioned to accept the ferrule body of the optical connector, and a connector engagement portion surrounding the ferrule opening; and
       the connector engagement portion comprises a perimeter notch within the second surface of the rear wall and surrounding the ferrule opening, the perimeter notch defining a connector engagement surface that is dimensioned to contact the mechanical engagement surface of the optical connector; and
     an active component assembly comprising:
       a substrate, wherein the substrate is coupled to the first surface of the rear wall; and
       an active component substrate comprising an array of active components, wherein the active component substrate is disposed on a surface of the substrate and is aligned with the ferrule opening of the rear wall on the surface of the substrate such that the array of lens elements of the optical connector are aligned with the array of active components when the optical connector is inserted into the receptacle.

8. The optical connector system of claim 7, wherein the optical connector further comprises a first alignment feature located in the first region of the mechanical engagement surface and a second alignment feature located in the second region of the mechanical engagement surface.

9. The optical connector system of claim 8, wherein the connector engagement surface of the receptacle comprises a first alignment feature positioned proximate a first edge of the ferrule opening, and a second alignment feature proximate a second edge of the ferrule opening that is opposite from the first edge, wherein the first alignment feature of the optical connector mates with the first alignment feature of the receptacle and the second alignment feature of the optical connector mates with the second alignment feature of the receptacle.

10. The optical connector system of claim 7, wherein the active component assembly further comprises a lens array substrate comprising an array of lens elements, wherein the array of lens elements is aligned with the array of active components of the active component substrate.

11. The optical connector system of claim 10, wherein the active component assembly further comprises a spacer coupled to the active component substrate, and the lens array substrate is coupled to the spacer.

12. A receptacle for receiving an optical connector, the receptacle comprising:
a receptacle body defining a connector cavity, the receptacle body comprising a first wall, a second wall, and a third wall, wherein:
the first wall is adjacent to the second wall;
the first wall comprises a first biasing member extending from an interior surface of the first wall;
the second wall comprises a second biasing member extending from an interior surface of the second wall; and
the third wall comprises a ferrule opening dimensioned to accept a ferrule body of the optical connector; and
an active component assembly comprising:
a substrate, wherein the substrate is coupled to an exterior surface of the third wall; and
an active component substrate comprising an array of active components, wherein the active component substrate is disposed on a surface of the substrate and is aligned with the ferrule opening of the third wall.

13. The receptacle of claim 12, wherein the active component assembly further comprises a lens array substrate comprising an array of lens elements, wherein the array of lens elements is aligned with the array of active components of the active component substrate.

14. The receptacle of claim 13, wherein the active component assembly further comprises a spacer coupled to the active component substrate, and the lens array substrate is coupled to the spacer.

15. The receptacle of claim 12, wherein the active component assembly further comprises at least one flexible cable electrically coupled to the substrate.

16. An optical connector system comprising:
an optical connector comprising:
a connector body comprising an insertion end having an opening;
a ferrule body extending from the opening of the connector body, the ferrule body comprising an optical coupling surface, wherein an array of lens elements is located at the optical coupling surface; and
a ferrule cover member disposed within the connector body, the ferrule cover member comprising a body, an engagement surface, and an opening within the engagement surface, wherein the ferrule cover member is operable to translate into and out of the connector body; and
a receptacle comprising:
a receptacle body defining a connector cavity, the receptacle body comprising a rear wall, wherein the rear wall comprises a ferrule opening dimensioned to accept a ferrule body of the optical connector; and
an active component assembly comprising:
a substrate, wherein the substrate is coupled to an exterior surface of the rear wall; and
an active component substrate comprising an array of active components, wherein the active component substrate is disposed on a surface of the substrate and is aligned with the opening of the rear wall,
wherein:
when the optical connector is in an unmated state, the ferrule cover member is biased in a forward position such that the optical coupling surface is disposed within the ferrule cover member, and
when the optical connector is in a mated state:
the ferrule cover member is in a retracted position within the connector body,
the engagement surface of the ferrule cover member contacts an interior surface of the rear wall, and
the ferrule body is disposed within the opening of the rear wall of the receptacle body.

17. The optical connector system of claim 16, wherein the active component substrate is aligned with the opening of the rear wall on the surface of the substrate such that the array of lens elements of the optical connector is aligned with the array of active components when the optical connector is inserted into the receptacle.

18. The optical connector system of claim 16, wherein the active component assembly further comprises a lens array substrate comprising an array of lens elements, wherein the array of lens elements is aligned with the array of active components of the active component substrate.

19. The optical connector system of claim 18, wherein the active component assembly further comprises a spacer coupled to the active component substrate, and the lens array substrate is coupled to the spacer.

20. The optical connector system of claim 16, wherein the active component assembly further comprises at least one flexible cable electrically coupled to the substrate.

21. The optical connector system of claim 16, wherein:
the receptacle body comprises a first wall and a second wall;
the first wall is adjacent to the second wall;
the first wall comprises a first biasing member extending from an interior surface of the first wall; and
the second wall comprises a second biasing member extending from an interior surface of the second wall.

22. The optical connector system of claim 16, wherein the engagement surface is located on a flange portion of the ferrule cover member.

23. The optical connector system of claim 22, wherein;
the optical connector comprises a plurality of bores within the ferrule cover member and a plurality of bores within the connector body; and the optical connector further comprises a plurality of cover bias members disposed within the plurality of bores within the ferrule cover member and the plurality of bores the connector body to bias the ferrule cover member in the forward position when the optical connector is in the unmated state.

\* \* \* \* \*